R. F. BAERLOCHER.
CONTROLLER FOR ELECTRIC MOTORS.
APPLICATION FILED FEB. 3, 1910.

1,074,925.

Patented Oct. 7, 1913.

WITNESSES:
Fred H. Miller
R. J. Dearborn

INVENTOR
Robert F. Baerlocher
BY
Wiley G. Carr
ATTORNEY

UNITED STATES PATENT OFFICE.

ROBERT FRIEDERICH BAERLOCHER, OF MANCHESTER, ENGLAND, ASSIGNOR TO WESTINGHOUSE ELECTRIC AND MANUFACTURING COMPANY, A CORPORATION OF PENNSYLVANIA.

CONTROLLER FOR ELECTRIC MOTORS.

1,074,925.            Specification of Letters Patent.            Patented Oct. 7, 1913.

Application filed February 3, 1910. Serial No. 541,798.

*To all whom it may concern:*

Be it known that I, ROBERT FRIEDERICH BAERLOCHER, a Swiss subject, and a resident of Manchester, England, have invented a new and useful Improvement in Controllers for Electric Motors, of which the following is a specification.

My invention relates to controllers for electric motors and it has for its object to so construct the operating mechanism of a controller that, when the controller handle is released during its movement through one portion of its range of travel, it will automatically return to a predetermined position, whereas, in another portion of its range of travel, the handle may be left in any desired position.

Various means may be employed for carrying out the invention and, in order that the nature of the same may be clearly understood, I will now proceed to describe, with reference to the accompanying drawings, one method which I have devised which has given satisfactory results in practice.

Figure 1:
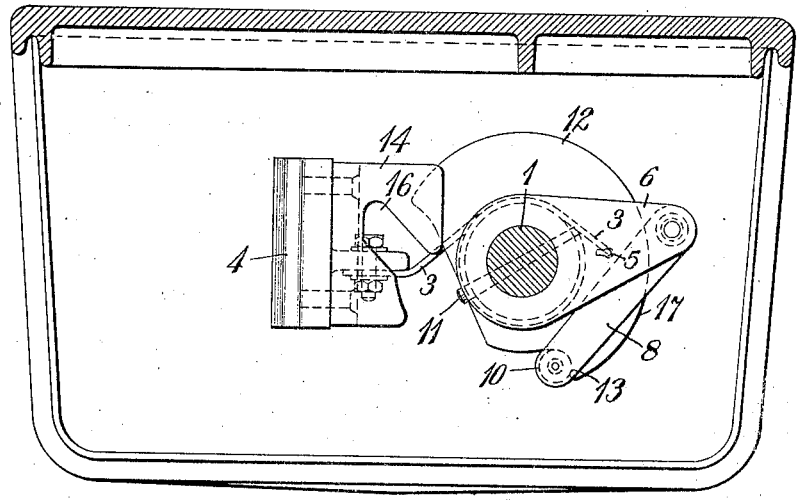
Figure 2:
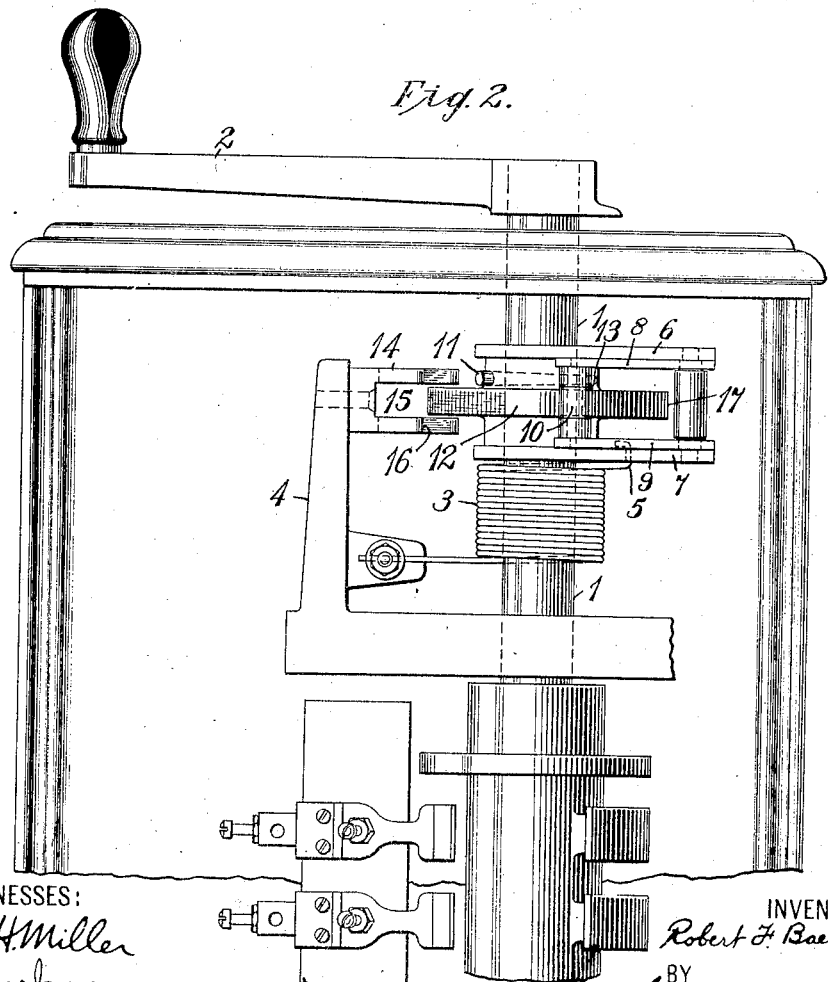

Figure 1 is a partially sectional plan view of a controller, and Fig. 2 is a side elevation of the upper part of the controller shown in Fig. 1.

The shaft 1 of the controller which carries the controller drum (not shown) is provided with the usual handle 2 and is surrounded by a helical spring 3 one end of which is attached to a bracket 4 mounted on a stationary part of the controller. The other end 5 of the spring 3 is connected to the lower one of a pair of links 6 and 7 which are loosely mounted upon the controller shaft 1. The outer ends of a second pair of links 8 and 9 are pivoted to the outer ends of the links 6 and 7 and their inner ends are connected by a roller 10.

Rigidly attached to the shaft 1 by means of a pin 11, is a cam disk 12 having a notch 13 in its periphery which is adapted to engage the aforesaid roller 10 in a certain position of the shaft. 14 is a block which is secured to the bracket 4 and has a recess 15 to permit the passage of the cam disk 12 and is provided with notches 16, as shown.

The roller 10 is preferably divided, as shown in Fig. 2, into three portions so that, after it has entered the notches 16, as hereinafter described, the middle portion can readily rotate in contact with the cam disk, and in opposite directions to the top and bottom portions, thus providing an easy movement.

The operation of the device is as follows:—When the controller handle 2 is rotated in the direction of the arrow, Fig. 1, the notch 13 in the cam disk 12 engages the roller 10, and the links 6 and 7 and 8 and 9 are moved around the controller shaft, thereby winding up the spring 3. After the shaft has been rotated through a certain range of movement, the roller 10 will be brought by the cam disk 12 into the notches 16 in the fixed part 14 and, if the shaft be further rotated, said roller will be held in these notches by the periphery 17 of the cam disk. It will be clear, therefore, that, during the first part of the movement of the shaft, the handle, if released, will be returned by the spring 3 to its initial position by reason of the engagement of the roller 10 with the notch 13 of the cam disk, while, during the second part of the movement of the shaft, that is to say, while the roller 10 is retained in the notches 16, the handle may be released and will remain in any desired position, since the shaft 1 is no longer in operative connection with the spring 3.

The device above described is particularly applicable to controllers for variable speed motors. In this case, during the first part of the movement of the shaft, the resistance in series with the motor armature is varied for the purpose of starting, it being desirable, as is well known, not to leave the controller in one of these positions; while, during the second part of the movement of the shaft, that is, after the roller has been engaged by the notched block, the resistance in circuit with the field of the motor is varied in order to give the desired variation in speed. The invention is, however, not limited to controllers for use with this particular type of motor, nor to controllers of the drum type, but may be applied to other controllers of various kinds which are employed with electric motors of different types.

I claim as my invention:

1. A controller for electric motors provided with means for automatically returning the movable member to a predetermined position when the controller handle is released during one portion of its range of travel, a cam carried by said movable member for effecting a storage of power in said returning means, and a latch for coöperation with said cam to lock the returning means and release said movable member therefrom at the end of said portion of the range of travel.

2. A controller for electric motors having its drum shaft provided with spring return mechanism, means carried by said shaft for storing power in said return mechanism during a portion of the range of travel of said drum shaft, and a device coöperating with said means to lock said return mechanism and release said shaft therefrom.

3. In a controller, the combination with a rotatable member, of a spring adapted to move said member to its off position, means carried by said rotatable member and detachably connected to said spring for storing power therein during a portion of the forward range of movement of said member, and a device for detaching the spring from said means and coöperating with said means to hold the spring in such detached relation during further forward movement of said member.

4. In a controller, the combination with a drum shaft and a spring adapted to return said shaft to its off position, of a set of links loosely supported by said shaft and connected to one end of said spring, a cam on the shaft for engaging said links and a latch adapted to coöperate with said cam to render the spring ineffective for a portion of the range of movement of said shaft.

5. In a controller, the combination with a drum shaft and a set of links loosely mounted thereon, of a retracting spring for said links, a notched cam keyed to the shaft and engaging said links to store power in said spring during a portion of its range of movement, and a latch for coöperating with the cam to hold the spring and links against operative movement for the remainder of said range of movement.

In testimony whereof, I have hereunto subscribed my name this twentieth day of January, 1910.

ROBERT FRIEDERICH BAERLOCHER.

Witnesses:
H. B. GREEN,
EUSTACE H. BARKER.